[12] United States Patent  
Fredlund et al.

(10) Patent No.: US 7,764,290 B2  
(45) Date of Patent: Jul. 27, 2010

(54) ARCHIVAL IMAGING SYSTEM

(75) Inventors: John R. Fredlund, Rochester, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 33 days.

(21) Appl. No.: 11/656,707

(22) Filed: Jan. 23, 2007

(65) Prior Publication Data

US 2007/0120860 A1   May 31, 2007

Related U.S. Application Data

(63) Continuation of application No. 10/397,825, filed on Mar. 26, 2003.

(51) Int. Cl.
  *G06T 1/00* (2006.01)
  *G06F 13/00* (2006.01)
  *H04N 5/76* (2006.01)

(52) U.S. Cl. .............. 345/537; 345/522; 348/231.2

(58) Field of Classification Search .............. 345/555, 345/522, 536, 537; 348/231.2
See application file for complete search history.

(56) References Cited

U.S. PATENT DOCUMENTS

| | | | |
|---|---|---|---|
| 5,493,335 A | 2/1996 | Parulski et al. | |
| 5,546,145 A | 8/1996 | Bernardi et al. | |
| 5,566,331 A | 10/1996 | Irwin et al. | |
| 5,625,816 A | 4/1997 | Burdick et al. | |
| 5,956,458 A | 9/1999 | Sezan et al. | |
| 6,043,625 A | 3/2000 | Dowe | |
| 6,052,764 A | 4/2000 | Mogul | |
| 6,106,457 A | 8/2000 | Perkins et al. | |
| 6,275,882 B1 | 8/2001 | Cheever et al. | |
| 6,308,168 B1 | 10/2001 | Dovich et al. | |
| 6,337,712 B1 | 1/2002 | Shiota et al. | |
| 6,445,460 B1 * | 9/2002 | Pavley ....................... 358/1.15 |
| 6,804,689 B1 | 10/2004 | Havrda et al. | |

(Continued)

FOREIGN PATENT DOCUMENTS

| | | |
|---|---|---|
| JP | 2000-267178 | 9/2000 |
| JP | 2000-284355 | 10/2000 |
| WO | WO 98/26586 | 6/1998 |
| WO | WO 00/01138 | 1/2000 |

*Primary Examiner*—Hau H Nguyen  
(74) *Attorney, Agent, or Firm*—Roland R. Schindler; Peyton G. Watkins

(57) ABSTRACT

An external memory system for use with an imaging system, and methods for archiving digital content are provided. The external memory system has a communications link adapted to exchange data with the imaging system; an archival memory device interface adapted to store data using an archival memory; and an external memory system processor adapted to automatically obtain content data files from the imaging system that have not yet been stored by the external memory system, to prepare the obtained content data files for archival storage and to cause the archival memory device interface to store the prepared content data files without guidance from an ancillary device; wherein said external memory system processor maintains a record of each content data file that has been stored using the external memory system and wherein the external memory system processor uses the record to identify content data files that have not yet been stored.

32 Claims, 7 Drawing Sheets

U.S. PATENT DOCUMENTS

| | | |
|---|---|---|
| 6,937,234 B1 | 8/2005 | Long |
| 7,110,026 B2 * | 9/2006 | Feldis, III ................ 348/231.6 |
| 2002/0149695 A1 | 10/2002 | Kayanuma |
| 2002/0180764 A1 | 12/2002 | Gilbert et al. |
| 2004/0021669 A1 | 2/2004 | Fredlund et al. |
| 2004/0201737 A1 | 10/2004 | Baron et al. |

* cited by examiner

ARCHIVAL IMAGING SYSTEM

CROSS REFERENCE TO RELATED APPLICATIONS

This is a continuation of application Ser. No. 10/397,825 filed Mar. 26, 2003 in the names of Fredlund et al.

FIELD OF THE INVENTION

The present invention relates generally to digital imaging, and more particularly, to methods and systems for archiving digital images and other content.

BACKGROUND OF THE INVENTION

Digital imaging systems are well known and include, for example, digital image capture devices, digital cameras, digital displays, camcorders, digital video recorders, computers, and kiosks. Such digital imaging systems can capture content in the from of digital still images, motion video segments, audio segments and/or other information hereinafter referred to collectively as content and convert this content into digital data. The digital data representing such content is stored by the digital imaging system in a memory. However, memories of the type that can be economically incorporated into a digital imaging system typically have a relatively limited capacity. Accordingly, it is frequently necessary to transfer the digital data representing the content from the digital imaging system to a separate memory such as an archival memory.

One popular way to transfer digital data representing content to a separate memory is to use a personal computer. For example, a digital imaging system such as the Kodak Easy-Share DX3600 digital camera can be programmed exchange data with a personal computer using an optional docking unit like the Kodak EasyShare™ docking station.

FIG. 1 shows an illustration of this prior art docking station and personal computer arrangement. In this example, a docking station 20 is connected to a personal computer 22 by way of a cable 24. Docking station 20 is adapted to receive a digital imaging system such as a digital camera 26. Computer software on personal computer 22 causes personal computer 22 to detect when digital camera 26 is connected to docking station 20 or to detect when a user of docking station 20 depresses a trigger button 28 on docking station 20. When the either these conditions are detected, the computer software causes personal computer 22 communicate with digital camera 26 and to extract content from digital camera 26 and to store this content in a memory (not shown) in personal computer 22. Docking station 20 also provides a connection that supplies power to digital camera 26 to recharge batteries (not shown) in digital camera 26.

The limitations of personal computers, such as personal computer 22, as content storage and processing devices are well known. Personal computers are often vulnerable to unanticipated failures occasioned by software conflicts, viral attacks, hardware incompatibilities, hardware failures and other mishaps. These failures can result in lost or damaged content and in difficulty in setting up and using the system. Further, to effectively utilize the personal computer, users must master an array of skills and software programs some of which are only somewhat related to the task of extracting and storing content obtained from an imaging system. Personal computers can also be burdensome to transport.

Despite these shortcomings of the personal computer, certain camera/docking station/personal computer arrangements have proven very successful. The success of these arrangements have given rise to a desire for a camera/and docking station arrangement that can be used to capture content and archive the content on a non-volatile medium with or without the use of a personal computer. Further, there is a need for a digital imaging system that can effectively archive content obtained by more than one digital imaging system.

Alternatively docking station systems have been developed such as the one that is described in U.S. Patent Application Publication No. 2002/0149695 entitled "Cradle for Information Apparatus, Cradle for digital camera and camera system" filed by Kayanuma, on Oct. 17, 2002. Various cradle systems are described therein that can extract image data from a digital camera and store the image data on a memory that is external to the camera. This memory can comprise a memory card or a hard drive in the cradle. The cradle is operable to display images and to transfer them from an embedded internal memory in the camera to a removable media such as a solid state memory or optical disk. Portable information devices such as a digital camera that do not include a content display means such as a video display, or removable memory are typically limited in application and performance. Further, the cradle/camera systems described in the '695 application while useful in providing a means to compensate for the absence of a video display and removable memory characteristics, they are not intended for use in archival storage and do not address many of the challenges associated with archival content storage.

For example, it is often desirable for content editing functions to be performed before images are stored on an archival memory. These editing functions can include but are not limited to moving, copying, or otherwise changing a sequence of content, decreasing the length of scenes, or the order of scenes, or adding audio, text and/or graphics to the content. Such editing actions can be easily performed using conventional solid state or other forms of read/write memory. However, many consumers have expressed a preference for archiving content on archival memory with greater perceived reliability and accessibility. Optical disks such as CDs and DVDs are therefore preferred because they are archival in nature and operable in a vast array of low cost presentation and reproduction devices such as a CD players, personal computers, DVD player and the like. Typical of content stored on such optical media is that the content is fully edited prior to production. For example, a person will extract favorite songs from a particular album onto a CD while not coping other songs from the same album. The system of the '695 patent does not address this problem.

The system of the '695 patent also does not address organizational and integration problems that can arise when a docking station is used to exchange data with more than one camera. For example, it can be difficult to determine whether an image has been downloaded under such circumstances as different cameras can use the same file names or other identifiers to describe content. Further, different cameras can store content in different forms with each form being incompatible with the form used by other cameras or with archival image storage preferences. For example, video content can be captured by one camera using a capture type format such as an AVI form while a smaller, compressed, archival form such as an MPEG4 is preferred for use by another camera or for use in archival storage.

Some digital imaging systems attempt to avoid the use a personal computer for archiving content by designing digital cameras such as conventional digital video cameras and the Sony Mavica line of digital still and video cameras that have an archival memory writing device within the digital camera. The archival memory writing device stores digital images on to an archival memory such as a digital video tape, floppy disk, compact disk (CD) or digital video disk (DVD). However, this arrangement expands the size, weight and cost of the digital imaging system into which it is incorporated. In cases where the archival memory is of the write once type as is the case with some CDs and DVDs, automatically storing the captured content on the write once media reduces the ability to perform editing operations prior to image archiving.

Thus, a further need exists for a method and system for archiving images captured by a digital imaging system that does not require that the imaging system is equipped with writing devices for recording content on an archival memory.

SUMMARY OF THE INVENTION

Methods for archiving digital content and, external memory systems used to archive digital content, are provided. In one aspect of the invention, an external memory system for use with an imaging system is provided. The external memory system has a source of content data files, and a communications link adapted to exchange data with the imaging system. An archival memory device interface is adapted to store data using an archival memory. An external memory system processor is adapted to automatically obtain content data files from the imaging system that have not yet been stored by the external memory system, to prepare the obtained content data files for archival storage and to cause the archival memory device interface to store the prepared content data files without guidance from an ancillary device. The external memory system processor maintains a record of each content data file that has been stored using the external memory system and the external memory system processor uses the record to identify content data files that have not yet been stored.

In another aspect, an external memory system is provided. The external memory system has a communications link adapted to exchange data with an imaging system having a source of content data files. An archival memory device interface is adapted to store data using one of a plurality of removable archival memories. An external memory system processor is adapted to automatically obtain content data files from the imaging system that have not yet been stored by the archival memory device interface using any of the removable archival memories, to cause the archival memory device interface to store the obtained content data files using at least one of the archival memories, and to maintain a record of each content data file that has been stored by the archival memory device interface. The external memory processor is configured to operate independent of a computer system.

In still another aspect, a method is provided for archiving digital content using an archival memory device interface to record data on one of a plurality of removable archival memories. The method comprises the steps of: detecting an imaging system having a memory with content data files stored thereon; identifying content data files that have not yet been stored by the archival memory device using one of the plurality by accessing a record of content data files that have been stored by the archival memory device interface; obtaining content data files that have not yet been stored on the archival memory system; preparing the obtained content data files for archival storage on an archival imaging system; and causing the archival memory device interface to store the prepared content data files on one of the plurality of removable archival memones.

In yet another embodiment, a method for archiving digital content data including at least some captured image content is provided. The method comprises the steps of: detecting an imaging system having an archival memory with digital content data stored thereon that has not yet been archivally stored using an archival memory device interface; obtaining the detected content data from the imaging system memory; preparing the obtained content data for archival storage by an archival memory device interface using an archival memory; and causing the archival memory device interface to store the prepared content data files using the archival memory and to maintain a record of the content data that has been stored. The step of detecting comprises identifying content data files that have not yet been stored by the archival memory device based upon one the record of stored content data files maintained by the archival memory device interface.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
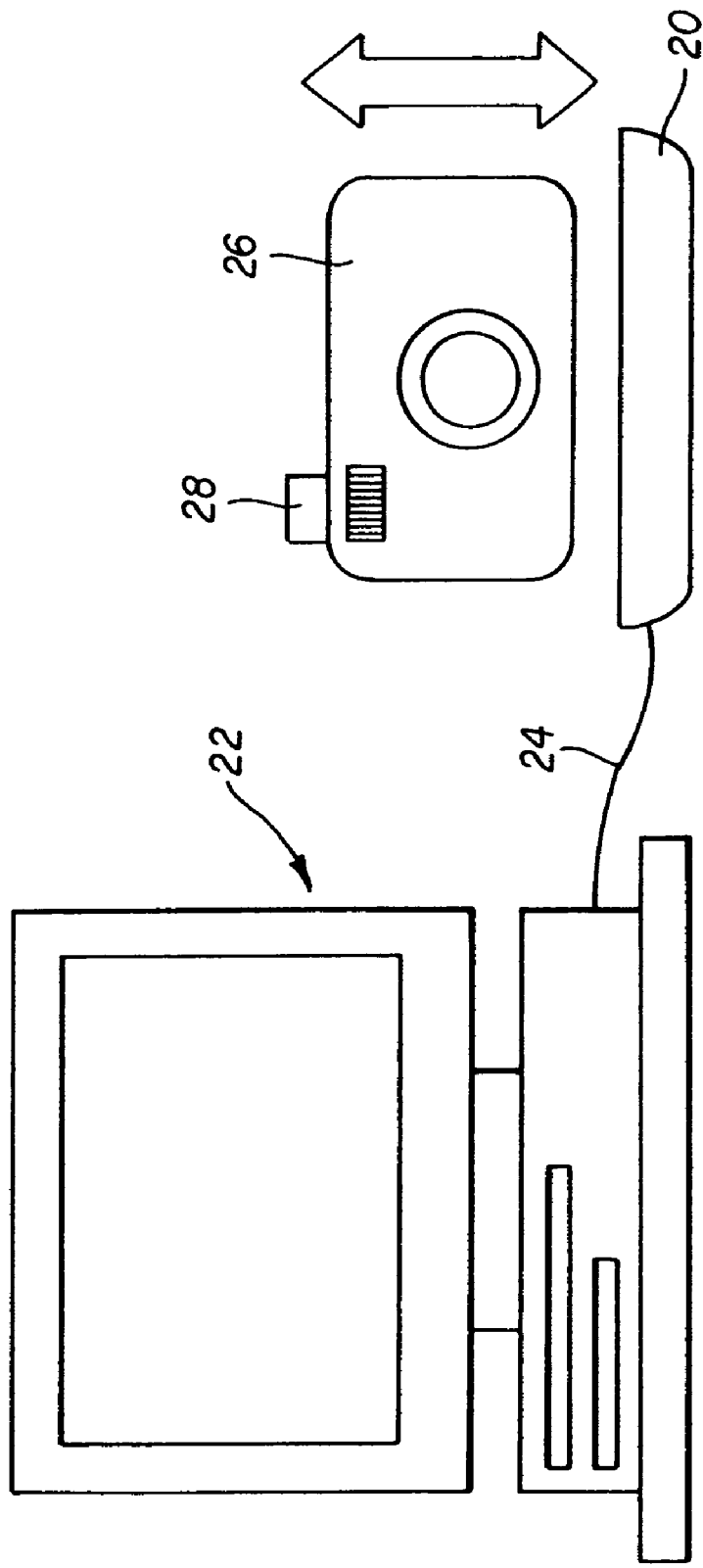
FIG. 1 shows a camera, docking station, personal computer arrangement of the prior art.

The following is a detailed description of the preferred embodiments of the invention, reference being made to the drawings in which the same reference numerals identify the same elements of structure in each of the several figures.

Figure 2:
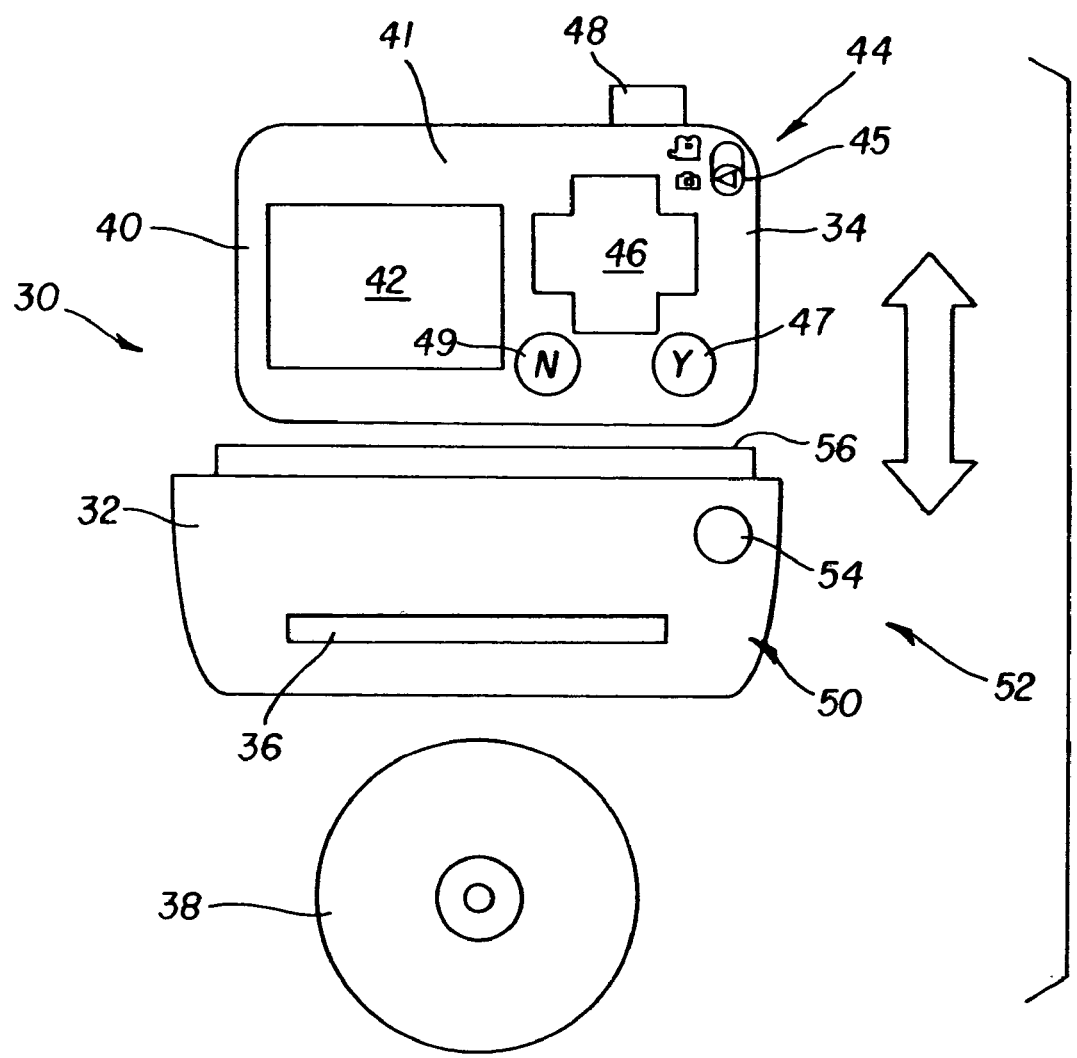
FIG. 2 shows one embodiment of an archival imaging system with an imaging system.

FIG. 2 shows a first embodiment an archival imaging system 30 of the present invention. As is shown in this embodiment a docking station 32 is provided and is adapted to receive an imaging system 34. The docking station 32 has a port 36 to receive an archival memory 38 shown in this embodiment as a Digital Video Disk (DVD) upon which digital data representing the content can be stored. However, other forms of archival memory 38 can be used such as magnetic tapes, disks, and optical media such as CDs that are adapted to receive digital data.

As is shown in FIG. 2, imaging system 34 has a body 40 with an interface surface 41 having a display device 42 with imaging system 34 user controls 44 including a 4-way controller 46 and a trigger button 48. Similarly, external memory system 32 has a control surface 50 with external memory system user controls 52 shown in this embodiment as a control button 54. External memory system 32 also has engagement surfaces 56 adapted to receive imaging system 34. Engagement surfaces 56 can be formed as an arrangement of raised surfaces and/or recesses or other structures useful in positioning imaging system 34 relative to docking station 32 when imaging system 34 is joined to external memory system 32. In the embodiment shown in FIG. 2, engagement surfaces 56 engage body 40 of imaging system 34 in a manner that causes interface surface 41 to be directed so that display device 42 is observable by a user facing control surface 50 of external memory system 32. With this arrangement, a user of external memory system 52 can observe display device 40 and use imaging system user controls 44 in addition to docking station user controls 46 to control operation of external memory system 32 when imaging system 34 is joined to external memory system 32. In this way, the cost of external memory system 32 can be lowered and external memory system 32 does not necessarily have to include an integral display device, and can optionally include fewer user controls and associated interface circuitry.

Figure 3A:
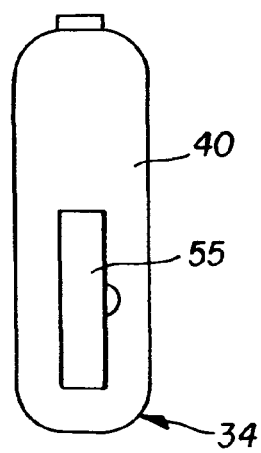
FIGS. 3a, 3b shows the embodiment of FIG. 2 imaging system showing an opening in body of imaging system with a protective door shown in an open position in FIG. 3a and in a closed position in FIG. 3b.
Figure 3B:
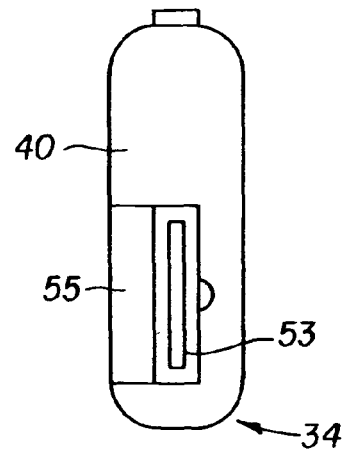

FIGS. 3a and 3b show the embodiment of FIG. 2 imaging system 34 showing an opening 53 in body 40 of imaging system 34 with a protective door 55 shown in a closed position in FIG. 3a and an open position in an open position in FIG. 3b. Opening 53 is adapted to receive a removable memory 58 for storing content. Removable memory 58 can provide a variety of functions such as providing buffer for a primary memory device (not shown) within imaging system 34 and can be adapted to receive content data files other data files having data obtained by imaging system 34.

Removable memory 58 can also provide a medium to transfer to and from ancillary devices (not shown) that can store content on removable memory 48 but that are adapted to be received by the external memory system 32. In this embodiment imaging system 34 can act as a buffer between such devices and external memory system 32 to provide a way to transfer data that is captured by ancillary devices that are not adapted for engagement with external memory system 32. Examples of such ancillary devices include devices such as a photo kiosk system, scanner system, MPEG player/capture device, personal computer, television set, Internet appliances, or other like devices. In this regard, docking station 32 and/or imaging system 34 can perform any necessary processing or transcoding of such data to convert the data into a form that can be usefully stored by external memory system 32 on for example on archival memory 38 or to convert data that is stored on external memory system 32 such as data stored on archival memory 38 into a form that is useful to the ancillary device. For example imaging system 34 can be adapted to convert images from a capture type format such as an AVI form into a smaller, compressed, archival form such as an MPEG4 form for storage. Processing and other electronic systems used by external memory system 32 and imaging system 34 that can be used to perform such transcoding and other functions will be described in greater detail below.

Figure 3C:
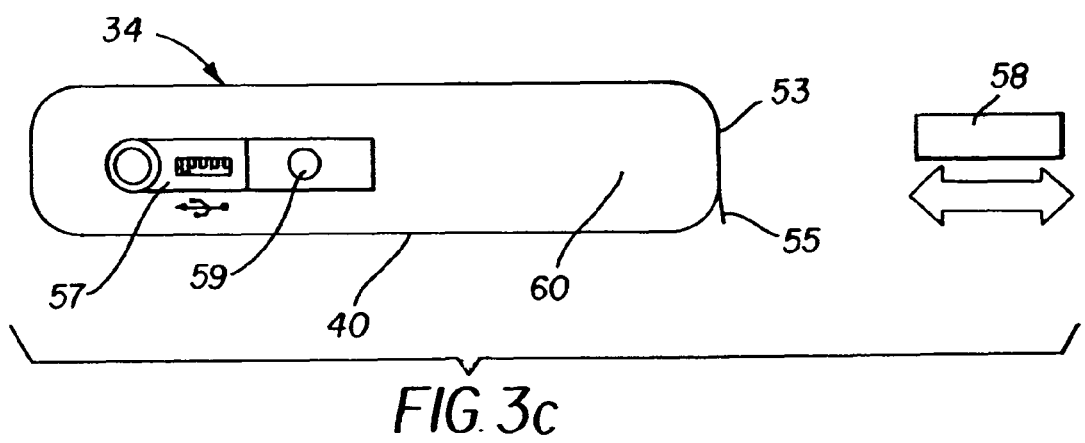
FIG. 3c shows a bottom view of the embodiment of FIG. 2.

FIG. 3c shows a bottom perspective view of imaging system 34 revealing an optional data connector port 57 and a power connector port 59 on a bottom surface of imaging system 34.

Figure 4:
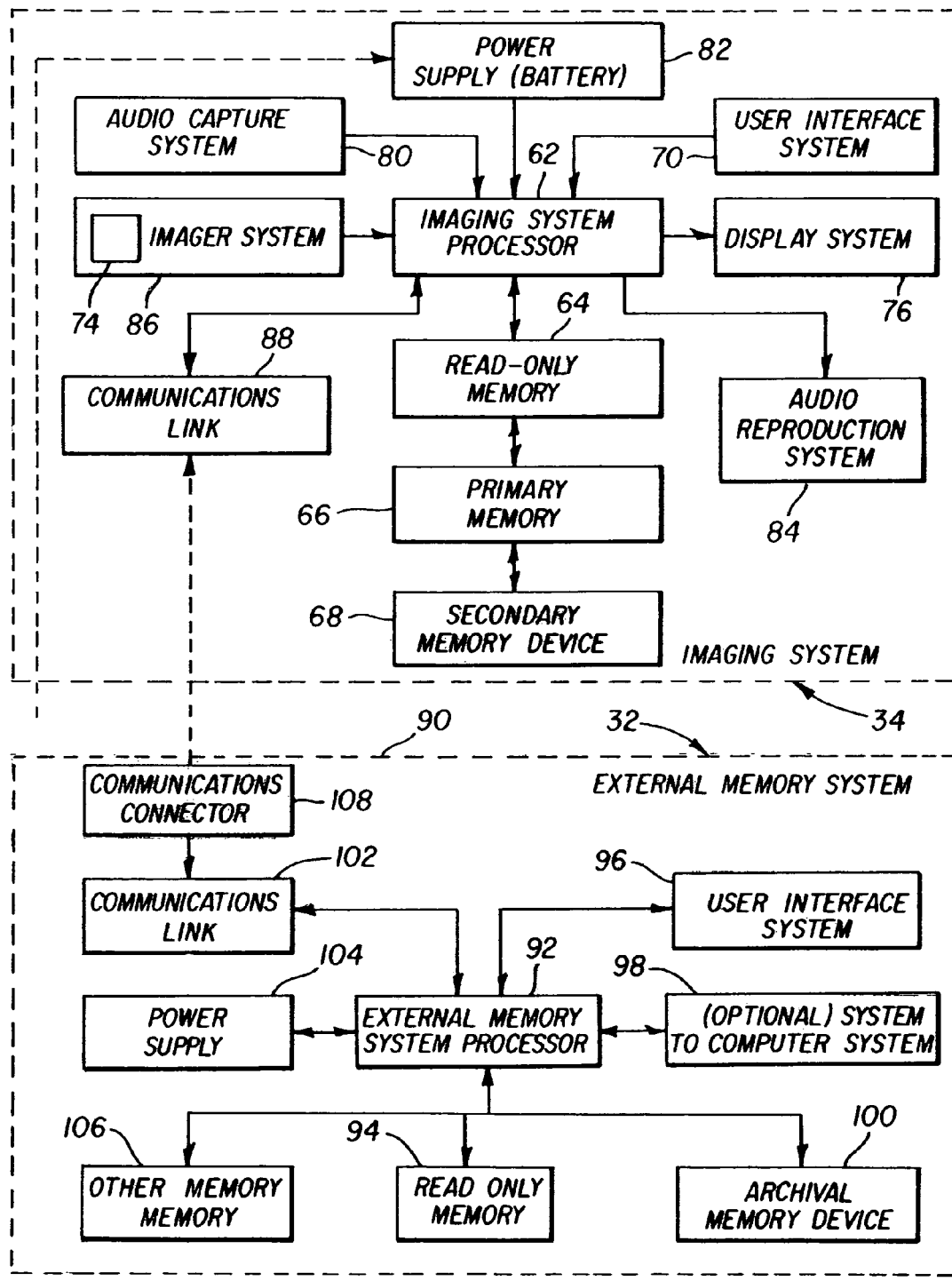
FIG. 4 shows a schematic illustration of one embodiment of archival imaging system 30.

FIG. 4 shows a schematic illustration of one embodiment of archival imaging system 30 comprising docking station 30 and imaging system 34. As is shown in this embodiment, imaging system 34 comprises an imaging system processor 62, a read-only memory 64, a primary internal memory 66, a portable memory device 68, a user interface system 70, a display system 76, an audio capture system 80, power supply 82, audio reproduction system 84, imager system 86 and communication module 88.

As is shown in FIG. 4, imaging system 34 is contained within body 40. Body 40 has an opening (not shown) to permit light from a scene to reach imager system 86. Imager system 86 includes a lens system (not shown) that focuses light from the scene onto an image sensor 74 in imaging system 86. Imager system 86 can include elements employed for image capture and image processing, such as image sensor 74 (e.g., CCD, CMOS), and other circuits and systems for using image sensor to capture and form image signals representing the appearance of the scene. These circuits and systems can include, but are not limited to amplifiers, analog-to-digital converters and digital image processors. These and other circuits and systems that can be beneficially employed in imager system 86 are disclosed in U.S. Pat. No. 6,292,218, issued Sep. 18, 2001, titled "Electronic imaging system for initiating capture of still images while previewing motion images", by Parulski et al, herein incorporated by reference.

During imaging operations, imaging system processor 62 receives image signals from imager system 86 and prepares image signals and other content for storage in digital form. Typically, the content is stored in the form of content data files. As used herein the term content data files includes any form or arrangement of digital data that can be used to store content. Imaging system processor 62 also controls the operation of image sensor 74, imager system 86 and a memory such primary internal memory 66 as during imaging operations. Imaging system processor 62 typically cause content to be captured based upon signals received from user interface system 70 and stereo microphones 84.

Imaging system processor 62 can comprise a microprocessor such as a programmable general purpose microprocessor that is operated in accordance with programs and instructions that are stored within an imaging system read-only memory 64 and/or other memories such as primary internal memory 66, or removable memory medium 68. Alternatively, imaging system processor 62 can comprise a dedicated micro-processor or micro-controller, or any other conventional electronic control system that can be used to control operation of imaging system 34.

User interface system 70 can comprise any form of transducer or other device capable of receiving an input from a user and converting this input into a form that can be used by imaging system processor 62 in operating imaging system 34. For example, user interface system 70 can comprise a touch screen input, a 4-way switch, a 6-way switch, an 8-way switch, a stylus system, a trackball system, a joystick system, a voice recognition system, a gesture recognition system or other such systems. In the embodiment shown in FIGS. 2 and 3, user interface system 70 has imaging system user controls 44 including a mode selection slide 45, a 4-way control 46 that can be used for a variety of functions, a yes button 47, a no a trigger button 48, adapted to be moved between an inactive non-depressed condition, a half depression position and a trigger position, with trigger button 48 transmitting a half-depression signal at the half depression condition and also transmitting a trigger signal to controller indicating a desire to capture an image when the trigger button is fully depressed. A no button 49 is also provided.

In the embodiment shown in FIG. 4 imaging system 34 also has an audio capture system 80 and an audio reproduction system 84. Audio capture system 80 comprises at least one sound transducer adapted to convert audio signals into an electronic signal and analog to digital conversion systems that converts the electronic signal into digital data that can be processed and/or stored by imaging system processor 62. Audio reproduction system 84 is used to convert digital audio content or content that includes audio components into audio signals and can include digital to analog converters, amplifiers and the like as is known in the art for converting digital data into audio signals. In some embodiments, audio capture system 80 and audio reproduction system 84 can share components.

Imaging system processor 62 can also be used to generate metadata in association with images and other captured content. Metadata is data that is related to particular content but that is not necessarily found in the data representing the content. In this regard, processor 62 can receive signals from user interface system 70, imager system 86, and sensors (not shown) such as light sensors and other useful sensors known in the art and, optionally, generates metadata M based upon such signals. Metadata can include but is not limited to information such as the time, date and location that content is captured, the type of imaging system 34 used to capture content, mode setting information, integration time information, or lens setting information that characterizes the process used in capturing content and in processing methods and algorithms used by imaging system 34 to form the archival image.

Metadata can also include but is not limited to any other information determined by imaging system processor 62 or stored in any memory in imaging system 34 such as information that identifies the imaging system such as an imaging system identification, the owner of the imaging system, and/or instructions for rendering or otherwise processing the archival image with which metadata is associated that can also be incorporated into the image metadata such an instruction to incorporate a particular message into the image.

The imaging system identification can be stored in read-only memory 64 so that the imaging system identification cannot be modified or erased. This provides a unique identification that can be used by external memory system 32 for purposes that will be described in greater detail below. This also permits easy tracking of imaging system 34 in the event that imaging system 34 is lost or stolen and subsequently used. Metadata can further include image information such as an evaluation image or a part of an evaluation image that is based upon the content.

Content and/or metadata can be stored in a compressed form such as using the JPEG (Joint Photographic Experts Group) ISO 10918-1 (ITU - T.81) standard. This JPEG compressed image data can also be stored using the so-called "Exif" image format defined in Exchangeable Image File Format version 2.2 published by the Japan Electronics and Information Technology Industries Association JEITA CP-3451. Other image compression and storage forms can be used.

Content and/or metadata captured by imaging system 34 is stored in a memory such as a primary memory 66 or secondary memory 68. Primary memory 66 is a memory device that is fixed within imaging system body 40 and can comprise, for example, a hard drive, non-volatile memory or other large capacity data storage device. Memory 66 can include conventional memory devices. Secondary memory device 68 is an interface adapted to receive and exchange data with removable memory 58. As noted above, secondary memory device 68 can receive and exchange data with a variety of removable memory devices 58 having content and metadata recorded thereon by ancillary devices as described above. In certain embodiments, secondary memory system 68 can act a memory buffer system allowing primary memory 66 to be used for one purpose while using memory system 68 for another purpose that would typically be performed by primary memory 66.

Display system 76 can comprise can comprise, for example, a color liquid crystal display (LCD), organic light emitting display (OLED) also known as an organic electroluminescent display (OELD) or other type of video display and appropriate drivers. Display system 76 can have a display device such as display device 42 to present images externally as is shown FIGS. 2 and 3. Alternatively, imaging system 34 have a display system with a display within imaging system 34 that presents images internally for observation for example by way of an electronic viewfinder (not shown). In still another alternative, display system 76 can have more than one display with one display presenting images externally and one presenting images internally.

Communication link 88 is provided in imaging system 34 for communicating with external memory system 32. The communication link 88 can be for example, an optical, radio frequency or other transducer that converts image and other data representing content into a form that can be conveyed to a co-designed communication link 102 in docking station 32 by way of electrical signals, optical signals, radio frequency signals or other forms of signal.

Communication link 88 can also be used to send and receive digital data containing content and metadata to and from a host computer, telecommunication network such as pager network, cellular telephone network and internet (not shown). Imaging system processor 62 can also receive information and instructions from signals received by communication module 88. It is recognized imaging system 34 can take many forms, such as a digital still cameras, video cameras, or camcorder, cellular or conventional telephone, handheld computing devices and kiosks adapted to obtain content by way of capturing the content. Imaging system 34 can also take other forms of imaging device that can store digital content and/or present the digital content but that do not contain an image capture system such as personal digital assistants, Internet appliances, portable video players, digital audio players, certain televisions, and other such devices. Where imaging system 34 is configured as an image capture device, display device 42 can further comprise a flash illumination system (not shown) or other illumination system (not shown) and sensors such as light sensors (not shown) useful in governing the operation of the imaging system. These and other systems useful in supporting image capture operations can be incorporated into imaging system 34 in such embodiments.

In the embodiment shown in FIG. 4, external memory system 32 is shown as comprising a external memory system body 90, a external memory system processor 92, non-volatile read-only memory 94, user interface system 96, optional computer link 98, and removable memory device system 100 for data exchange with removable memory 38, communications link 102, a power supply 104, other optional memory 106 and an optional communications connector.

External memory system 32 has an external memory system body 90 having control surface 50 and engagement surfaces 56 thereon. External memory system 32 has a power supply 104 and imaging system 34 also has a power supply 82. By way of an electrical connector (not shown), external memory system power supply 104 can be configured as a power source for imaging system 34 or as a charger for a power supply (e.g., battery) disposed within imaging system 34. Additionally, engagement surfaces in external memory system 32 can incorporate an additional connector for charging additional batteries.

As is noted above in the embodiments shown in FIGS. 2, 3, and 4, imaging system 34 includes a display device 42 and control surface 50 that can be viewed while imaging system 34 is docked within external memory system 32. In this regard, it will be appreciated that display 34 is not obstructed from a user's view by engagement surfaces. In one optional embodiment engagement surfaces 56 can be pivoted to provide a preferred viewing angle of display device 42. In another optional embodiment, engagement surfaces 56 are defined so as to cooperate with audio capture system 80 and audio reproduction system 84 so as not to interfere with sound capture or reproduction while imaging system 34 is in external memory system 32. Alternatively, external memory system 32 can be designed to incorporate sound directing ports and/or baffles to cooperate with audio capture system 80 and/or audio reproduction system 84 to enhance the quality of audio capture reproduction when imaging system 34 is in external memory system 32.

Disposed within engagement surfaces 56 is an optional communication connector 108 which is used in this embodiment to be matingly connected with communication link 88 of imaging system 34 when imaging system 34 is docked within engagement surfaces 56. When docked, this communication connector 108 provides a communication path between communication module 88 and communications link 102. It is recognized that in other embodiments other communication systems known to those skilled in the art can be employed in addition to a wired connection or in place of a wired connection. For example, a wireless communication systems and optical systems can be used to exchange data such content and metadata between the imaging system 34 and external memory system 32.

An external memory system processor 92 controls operation of external memory system 32. External memory system processor 92 can comprise a microprocessor such as a programmable general purpose microprocessor that is operated in accordance with programs and instructions that are stored within external memory system non volatile read-only memory 94 and/or other memory systems in external memory system 32 such as an archival memory device 100 and an internal memory 106. Alternatively, imaging system processor 62 can comprise a dedicated micro-processor or microcontroller, or any other conventional electronic control system that can be used to control operation of the imaging system 34.

External memory system 32 has an external memory system user interface system 96 that can comprise any form of transducer or other device capable of receiving an input from a user and converting this input into a form that can be used by external memory system processor 92 in operating 32. For example, user interface system 96 can comprise a touch screen input, a 4-way switch, a 6-way switch, an 8-way switch, a stylus system, a trackball system, a joystick system, a voice recognition system, a gesture recognition system or other such systems.

In operation, external memory system processor 92 determines when communication is established between external memory system 32 and imaging system 34. For example, when communication module 88 and communication link 102 are joined by way of communication connector 108, communication link 102 can send a communicate a signal to external memory system processor 92 indicating communication module 88 and communication link 102 are joined. Where such a physical connection is provided, conventional technologies such as the Uniform Serial Bus, RS-232, broadband, I.E.E.E. 1394, so called "firewire" or other technologies can be used to exchange data between communication module 88 and communication link 102.

In embodiments where radio frequency communications or other forms of communications that do not require the formation of a physical link between communication module 88 and communication link 102 are used, communication link 102 can provide a signal to external memory system processor 92 indicating that radio frequency communications have been established. It will be appreciated that the where such radio frequency or other non-contact based communications are used, engagement surfaces 56 can be optional.

In the embodiment shown in FIGS. 2, 3, and 4, when the imaging system 34 is docked within engagement surfaces 56 of external memory system 32, or when external memory system processor 92 otherwise determines that communications have been established with imaging system 34, external memory system 32 can be configured to automatically download all new content data files stored on imaging system 34. External memory system processor 92 stores using archival memory device interface 100. In the embodiment shown in FIGS. 2, 3, and 4, archival memory device interface 100 is adapted to receive and to exchange data with archival memory 38. As noted above, archival memory 38 can comprise for example, a digital tape, an archival film system that records data in the form of optical images on photosensitive film, various forms of non volatile solid-state memory, optical memory disks such as compact discs or digital videodiscs and other forms of archival memory. Archival media 38 can be fixed within that he station 32, or, as a shown in the embodiments of FIGS. 2, 3, and 4, archival memory 38 can be removable with archival memory device interface 100 being adapted to permit insertion removal of the archival memory 38. Additionally, external memory system 32 can obtain data from archival memory 38 and can provide this data to imaging system 34.

Figure 5:
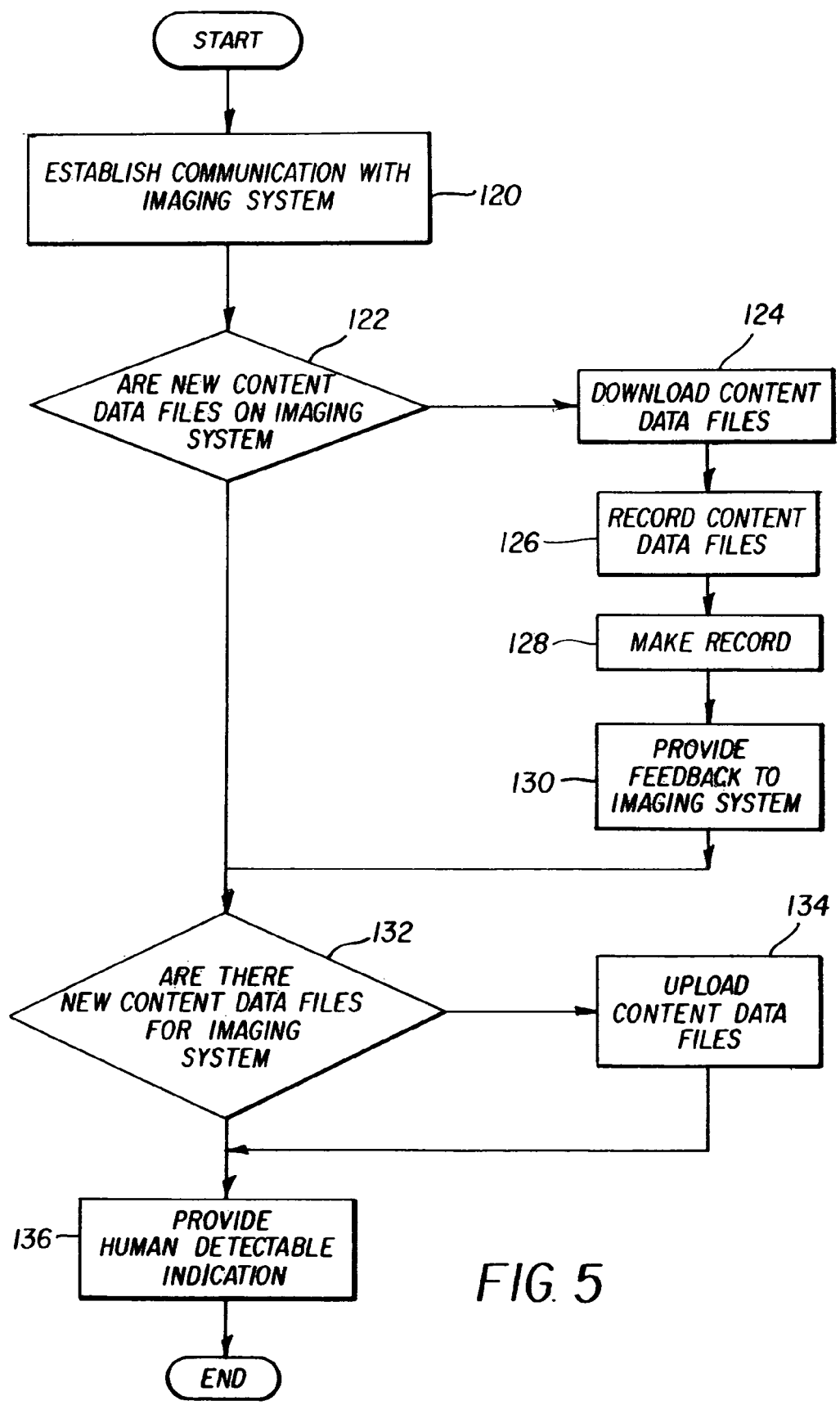
FIG. 5 shows one embodiment of a method for archiving content data files in accordance with the present invention.

FIG. 5 shows a first embodiment of a method for archiving content data files. As a shown in FIG. 5, a first step in this method is to establish communications between external memory system 32 and imaging system 34 (step 120). This can be done as described generally above.

A determination is then made as to whether imaging system 34 contains content data files that have not been recorded by external memory system 32 (step 122). There are various ways in which this can be accomplished. For example, during each image transfer operation, a record of content data files that have been stored in an archival memory 38 can be formed and maintained in external memory system 32 for example in archival memory 38 or in other memory 106. The record can contain various types of data. For example, the record can comprise data identifying the content data files such as a content data file name, date and time information, date time and camera identification information, data extracted from the content, or a modified version of the content in the content data file.

In one embodiment imaging system 34 is adapted to provide unique file names for each content data file stored thereon. These unique file names can be used to determine whether the content data files have been previously stored. Where imaging system 34 has a unique camera identification number, that unique camera identification number can be used in conjunction with time and date information to define unique file names. In this example, the unique file name can include a combination of time, date and imaging system identification number such as:

$MM_{13}DD\_YYYY\_HR\_MIN_{13}SEC\_ISIDNUMBER$ file type.

Wherein MM represents the month, DD represents the day and YYYY represents the year that the content is captured while, HR represents the hour, MIN represents the minutes after the hour and SEC represents the seconds after the hour when the content is captured. The ISIDNUMBER is the unique imaging system identification number and FILE-TYPE identifies the type of content file. Various file type identifiers are known in the digital arts. These file types help to identify decoding and image processing algorithms useful in forming images or other output content based upon the content.

Where the content is captured over a period of time, as occurs in video imaging sequences, the unique file name can incorporate a start time and an end time, for example a sequence such as:

MM_DD_YYYY_SHR_SMIN_SSEC_EHR_
EMIN_ESEC_ISCODE.FILETYPE can be used wherein MM represents the month, DD represents the day and YYYY represents the year that the content is captured while, the combination of SHR—SMIN—SSEC represents the hour, the minutes after the hour and seconds after the minute at which the capture of the content began. The combination of EHR_EMIN_ESEC represents the hour, the minutes after the hour and the seconds after the minute at which the capture of the content ended. The ISIDNUMBER is the unique imaging system identification number and FILETYPE identifies the type of content file. Various file type identifiers are known in the digital arts. These file types help to identify decoding and image processing algorithms useful in forming images or other output content based upon the content. It will be appreciated that using this combination to define file names for content data files ensures that each content captured by an imaging system will include a unique identifier. External memory system 32 can determine whether new content is recorded on an imaging system 34 by maintaining a record of such file names.

It can be determined that a particular content data file has previously been stored in a non volatile memory by searching for the content data file in the record. It will be appreciated that, where content data files are stored on an archival memory 38 a can be removed from external memory system 34, it is useful to the to store the record apart from the removable archival memory 38. So that the external memory system processor 92 can determine whether a particular content data file has been stored on an archival memory even where such a content data file has been stored on a can a removable non volatile memory that is not located in the removable memory interface 102 at the time of capture.

In another alternative of this type, such a record can be recorded in a memory such as primary memory 66 of imaging system 34 or in some other database that is accessible to external memory system 32 by way of communication link 102.

In another alternative embodiment, a record can be stored in each content data file in the imaging system memory indicating when the content data file has been stored in a non volatile memory. This can be conveniently done by storing the record in a header portion of a content data file where the content data files on the imaging system include such a header portion. Other methods for storing such a record within a content data file can also be used. The actual step of storing the record within the content data file can be performed by imaging system signal processor 62, external memory system signal processor 92 or some combination thereof. For example, after a content data file has been provided by imaging system 34 to external memory system 32, external memory system processor 92 can provide one or more feedback signals to imaging system 34 indicating which content data files have been recorded on the archival memory. Where this is done, each content data file on imaging system 34 can be examined to determine whether the content data file has previously been stored in a non-volatile archival memory based upon the presence, absence or content of the record stored in that content data file. Storing the record in a content data file that is on imaging system 34 has the advantage of ensuring that there will be little risk that unnecessary archival copies of content data files stored on imaging system 34 will be made if imaging system 34 is docked with more than one external memory system 32.

If content data files are found that have not been previously recorded on an archival memory 38 then, such content data files can be automatically obtained from imaging system 34 by external memory system 32 (step 124). The downloaded files are then prepared for archival storage (step 126). There are various ways in which a content data file can be prepared for storage. For example, user interface system 70 can be adapted to receive inputs indicating preferences for the preparation of content data files for archival storage. The content data files can be processed in a variety of ways based upon the indicated preferences. Such preferences can involve preferences for the type of content data files to be stored, preferred storage formats, maximum file size for content data files, or other preferences that can influence the processing of content data files such as image or audio improvement processes. In another embodiment the preparation step can involve receiving inputs from a user interface imaging system user interface system 70 indicating instructions for editing content data files wherein the step preparing of content data files comprises editing the content data files in accordance with the editing instructions. In still another embodiment the step of preparing the content data files for archival storage (step 126) can comprise converting the content data files from one format to a second format. For example, a content data file can be captured in a capture format such as an AVI format but prepared for storage by converting the content into an MPEG-4. In a further embodiment, step of preparing the content data files for archival storage (step 126) can comprise associating metadata with the content data files.

After the content data files have been prepared for archival storage, the content data files are stored on an archival memory 38 (step 128). Alternatively, external memory system 32 can store content data files in memory 106 for recording on archival memory 38 at a more convenient time.

A record can then be made by external memory system 32 or imaging system 34 that indicates each content data file that has been stored (step 132). The record can be stored in any of the manners described above and used in future docking events to determine whether content data files are recorded on imaging system 34 that have not previously been downloaded. A feedback signal can be transmitted to imaging system 34 indicating that all new files have been downloaded (step 132).

In the embodiment shown in FIG. 5, the method of the present invention also include the optional step of determining whether there are new content data files to be transmitted from external memory system 32 to imaging system 34 (step 134). This determination can be made, on the basis of user inputs received by external memory system user interface system 96, and/or imaging system interface system 72 of imaging system 32. For example, a user of the archival imaging system 30 can instruct external memory system 32 to transfer content from archival memory 38 to imaging system 34 so that content data files that have been previously recorded in archival memory 38 can be displayed or otherwise presented by imaging system 34. In another example, a user of imaging system 34 can use user interface system 70 of imaging system 34 to request content data files that are not currently stored on a memory of imaging system 32 when imaging system 32 is not in communication with the external memory system. Where this is done, imaging system processor 62, stores information relative to this request in a memory such as primary memory 66 and, during a subsequent docking events wherein communication is established between imaging system 34 and external memory system 32, imaging system processor 62 can provide a request to external memory system processor 92 for this content.

Where it is determined that there are content data files are to be provided to imaging system 32, external memory system processor 92 can obtain the desired content data files from the archival memory 38 or other memory and external memory system 32 and can upload these content data files to imaging system 34 (step 134).

As noted above, imaging system 34, can be adapted to receive removable memory 58 and to convert content data files into a form that can be stored on removable memory 58 and used by an ancillary device (not shown) that may require content to data files to be recorded in a form or format that differs from that typically used by imaging system 34. A situation such as this the step of uploading the content data files (step 136) can also include the transcoding the content data files. For example, imaging system user interface 70 and/or external memory system user interface system 96 can be used to indicate the type of device that will receive removable memory 58 so that imaging system processor 62 and/or external memory system processor 92 can perform necessary transcoding operations to convert data content files stored in external memory system 32 into a form that will be useful by the ancillary device. Alternatively, where removable memory 58 contains data that can be used to determine the type of imaging system 30 ancillary imaging system that will be used that will use the content data files stored on removable memory 58, either of imaging system processor 60 or control external memory system processor 92 will can be adapted to detect this information, to determine any necessary transcoding operations based upon said information, and to perform the necessary transcoding operations.

As is shown in FIG. 5, a further step of providing a human detectable indication be provided indicating that new content data files on imaging system 34 have been stored in external memory system 32 and or that content data files stored in external memory system 32 have been transferred to imaging system 34 (step 138). This human detectable indication can comprise a video signal presented for example by display device 42 of imaging system 34 or it can provide an audio signal generated for example by sound reproduction system 84. In one embodiment, the successful transfer of content data files can confirmed by performing a verification step (not shown) that ensures that the content data files have been properly prepared and transferred. Where this optional verification step is performed, the human detectable indication can provide an indication that the transfer has been verified.

Figure 6:
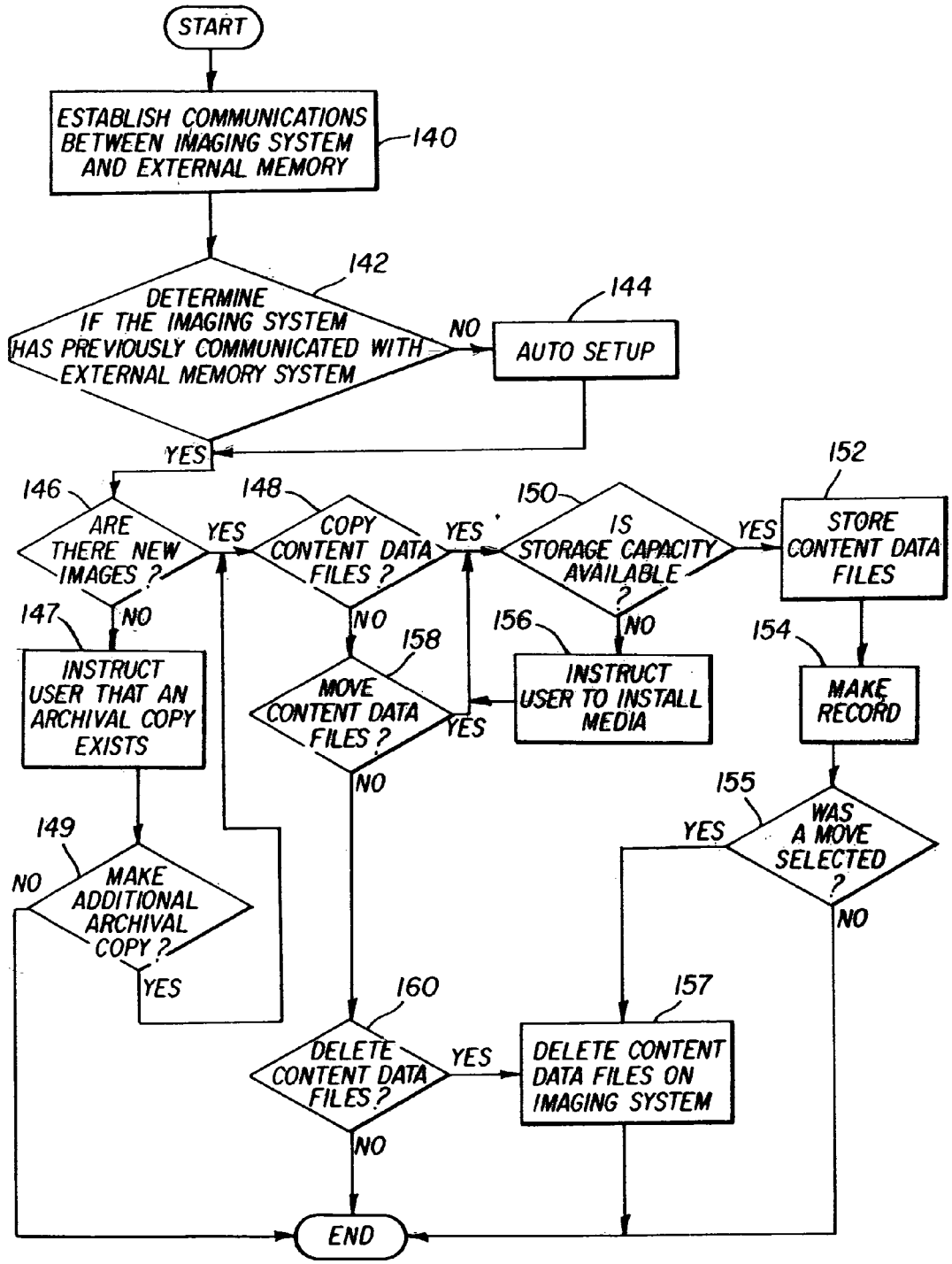
FIG. 6 shows another embodiment of a method for archiving content data files.

FIG. 6 shows yet another embodiment of a method of the present invention in which content data files are prepared and/or selectively stored in accordance with user input. As is shown in FIG. 6, in a first embodiment of this method, communications are established between external memory system 32 and imaging system 34 (step 140). This step can be performed as is described above. In this embodiment, an optional step of determining whether external memory system 32 has previously communicated with imaging system 34 is then performed (step 142). There are a variety of ways in which this determination can be made. For example, as noted above, imaging system 34 can be assigned an imaging system identification number, code or symbol that is recorded for example in read-only memory 64 imaging system 34. Alternatively, imaging system 34 can contain user identification information such as a name, identification number, and identification code of a user or owner of the imaging system 34. Such an identification can for example be stored in primary memory 66. External memory processor 92 can determine whether external memory system 32 has previously communicated with imaging system 34 based upon this identification. In still other embodiments, a flag can be recorded in primary memory 66 of imaging system 34 by external memory system 32 that indicates that imaging system 34 has previously communicated with external memory system 32. It will be appreciated that other forms of data can be recorded in either imaging system 34 or external memory system 32 that can be used to make this determination. Further, other characteristics of imaging system 34 can be analyzed by external memory system processor 92 to determine whether imaging system 34 has previously communicated with external memory system 32.

When it is determined that imaging system 34 has not previously communicated with external memory system 32, external memory system processor 92 can perform execute auto step functions. These functions can include exchanging identification information between external memory system 32 and imaging system 34, providing firmware updates, drivers, and the like to facilitate communication and operations so that external memory system 32 can effectively communicate with and process content data files provided by imaging system 34 (step 144). In one embodiment, external memory system 32 maintains a list of imaging systems with which it has communicated and associates with each imaging system information that facilitates obtaining content data files provided by imaging system 34 and/or information that facilitates processing and transfer of data files from external memory system 32 to each such imaging system 34. Such information can include but is not limited to transcoding information, communication instructions, and security information such as passwords and encryption information.

It is then determined whether new content data files are stored in a memory imaging system 34 (step 146). This step can be performed as described above. As is shown in FIG. 6, however, in this embodiment, when such a content data files are detected, a user is permitted to selectively provide input directing external memory system 32 in the way in which such content data files are to be disposed.

Figure 7:
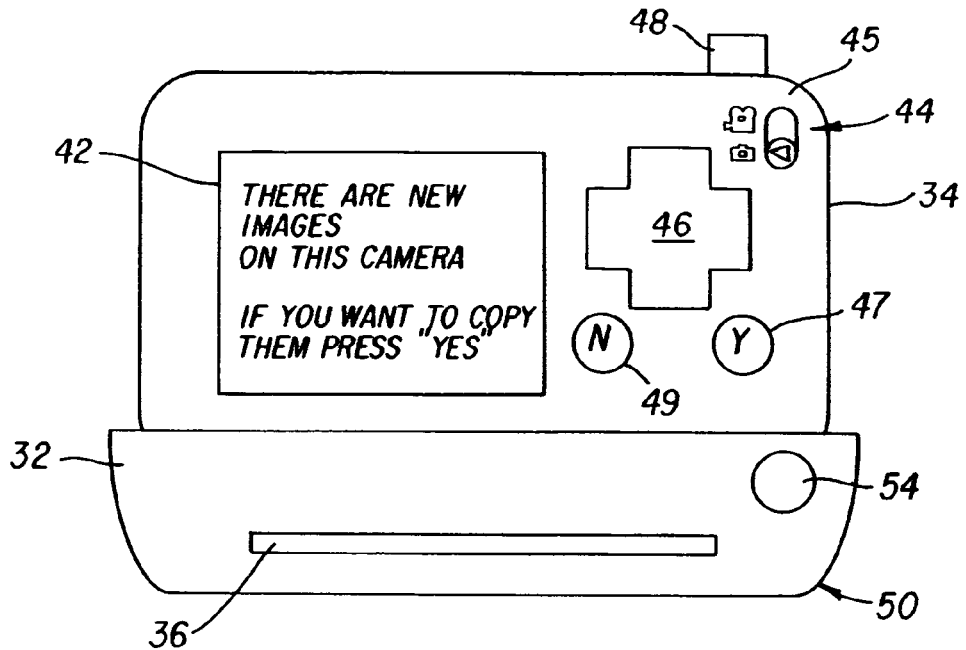
FIG. 7 shows an embodiment of a prompt that can be used to obtain input from which content data files can be identified for storage.

For example, a user can be asked whether the user wishes for the prepared images to be copied to external memory system 32. (step 148) As shown in FIG. 7, in this can be done using display device 42 of imaging system 34 to solicit a user input requests and input indicating how the new content data files are to be disposed. Further, display device 42 can be used to provide a sequential series of instructions appropriate to the task requested by the user. FIG. 7, shows an example of a prompt screen that can be displayed using display device 42 that indicates that are new images on the imaging system 34 that have been previously prepared for storage and asks whether the user wishes to copy all of the images.

If the user chooses to do so, user depresses yes button 47. When a external memory system processor 92 detects that a user has depressed yes button 47, external memory system processor 92 performs a step of determining whether there storage station storage capacity external memory system 32 in order to store the new content (step 150). Where there is sufficient storage capacity available, external memory system processor 92 copies all new content data files from imaging system 34 and stores these content data files for example in archival media 38 (step 152) and a record is made (step 154) in any of the manners described above. A check is performed to determine whether the user indicated a copy disposition or a move disposition (step 155). Where the copy disposition is selected, content data files on the imaging system 34 are left intact. Where there is not sufficient memory capacity to store all of the new content data files, a user can be prompted to insert new archival media in external memory system or to take some other action so that the content data files can be stored (step 156) This prompt can be presented using for example display device 42 or audio reproduction system 84.

However, where a user depresses the no button 49 in response to the copy prompt (step 150), user can be provided with other options. In the embodiment shown in FIG. 6, one other option is to present the user with a move images prompt (step 158). Here, display device 42 is used to ask whether the user would like to move the new content data files from imaging system 34 to external memory system 32. When a external memory system processor 92 detects that a user has depressed yes button 47, external memory system processor 92 performs a step of determining whether there is sufficient storage capacity in external memory system 32 in order to store the new content data files (step 150). Where there is sufficient memory capacity available, external memory system processor 92 copies all new content data files from imaging system 34, stores these content data files in a memory such as archival memory 38 (step 152) and makes a record indicating which content data files have been stored (step 154). It is also determined that a move command has been selected, (step 155) which causes the new content data files to be deleted (step 157) from imaging system primary memory 66 or removable memory 58 to increase the amount of memory data storage capacity that is available in imaging system 34.

In the event that the no button is depressed in response to the move prompt (step 158) docking system processor 92 can cause display device 42 to present an prompt inquiring whether to delete all of the new content data files (step 160). If the yes button 47 is depressed in response to this prompt, then all new content data files on the imaging system 34 can be deleted without recording the content data files on a memory in imaging system 34. This can be done, where, for example, a user does not wish to have any of the content of imaging system 34 stored in an archival fashion. In the embodiment shown, if no button 49 is depressed in response to this inquiry then the process returns to step 150.

As is also shown in FIG. 6, it can occur that one or more of the content data files on the imaging system 34 have been previously stored. When this occurs, the optional steps of indicating to the user that content data files on imaging system 34 have previously been stored is performed (step 147) and the user is permitted with an opportunity to cause the content data files to be stored again (step 149). This is useful where it is desired to make a duplicate copy of the content data files on an archival media. This is also useful where a record is preserved in the imaging system, and the imaging system communicates with more than one external memory system 32.

Figure 8:
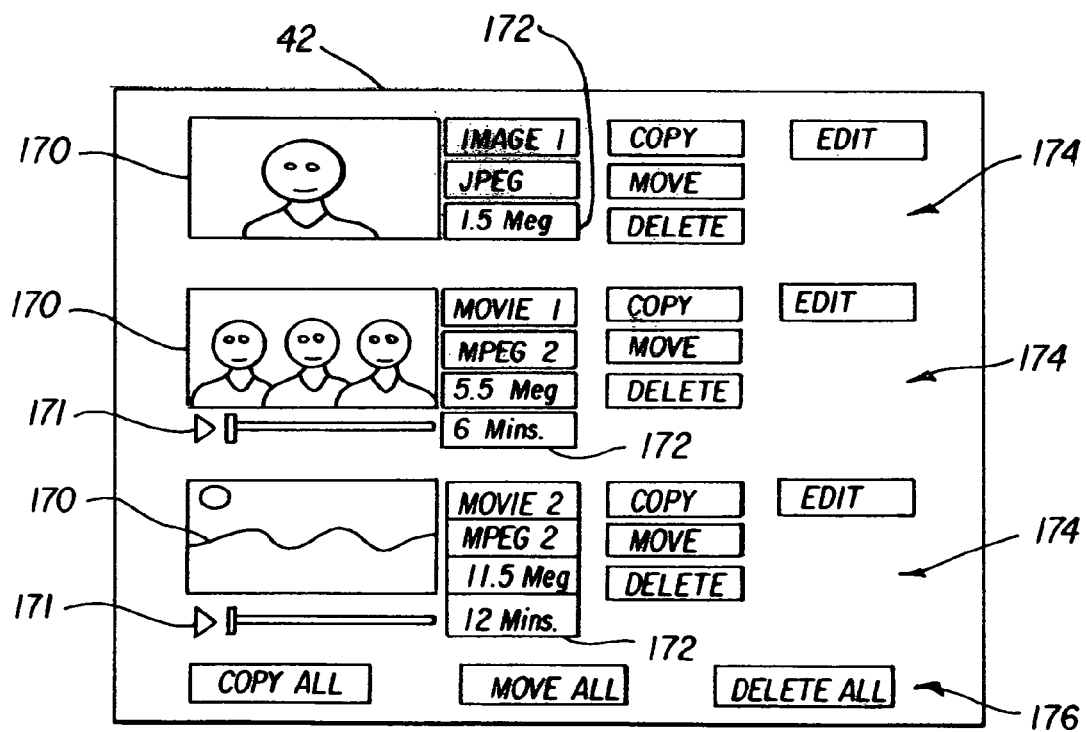
FIG. 8 shows another embodiment of a prompt that can be used to obtain input from which content data files can be identified for storage or other processing.

FIG. 8 shows a view of another prompt from which content data files can be identified for storage or other processing. As is shown in this embodiment, when new content data files are detected in imaging system 34 by external memory system 32, external memory system processor 92 causes display 42 of imaging system 34 to present thumbnail images 170 representing the new content. As is shown in this embodiment, each thumbnail image 170 is associated with a descriptor of the content 172 and with options for disposition 174. In the example shown, each thumbnail image 170 is associated with disposition options 174 such as copying, moving, deleting, or editing the content data file.

User interface system 70 and/or external memory system user interface system 26 can be used to indicate suggested disposition of the content. For example, in the embodiment shown in FIG. 8, the dispositions of copy, move, delete are shown and these inputs can be used as described above. For example, 4-way controller 46 can be used to navigate between images and option disposition options with other user controls such as trigger button, no button or yes button used to make selections. Further, in the embodiment shown in FIG. 8, a user is also provided with the option to edit content data files. This editing can be performed before the content data file is stored. The embodiment of the prompt shown in FIG. 8 also includes group disposition options 176 to permit a user to select a disposition for all of the content data files. As is also shown in FIG. 8, when the content data file contains a video sequence, the initial thumbnail image 170 can represent the initial image in the video sequence and a play/progress indicator 171 can be used to cause the video sequence to be played. Where this is done, the video sequence can be played as a thumbnail image with the progress indicator 171 indicating where along the sequence the currently presented video image is located. It is also known in the art to reproduce any associated sound with the video display.

In still another embodiment external memory system 32 can receive preference information indicating predefined preferences for content disposition. For example, imaging system user interface system 70 and external memory system user interface system 96 can be used to enter profile information such as selecting an "always move new images to external memory system" selection.

In a further embodiment of the invention content management elections can also be made. For example imaging system user interface system 70 and external memory system user interface system 96 can be used to receive information useful in organizing the content. In this example, such information can comprise an election to group content data files in groups based upon for example, a chapter can include all content that is captured by imaging system 34 or other imaging systems with on a particular day or within a particular period of time. Other useful groupings can be arranged based upon analysis of the content or metadata associated with the content. The content data files can be grouped according to content type or the groups can include mixed image. Such grouping criteria can be incorporated into a profile.

The invention has been described in detail with particular reference to certain preferred embodiments thereof, but it will be understood that variations and modifications can be effected within the spirit and scope of the invention.

PARTS LIST 20 external memory system
22 personal computer
24 cable
26 digital camera
28 trigger button
30 archival imaging system
32 external memory system
34 imaging system
36 port
38 archival memory
40 body
41 interface surface
42 display device
44 imaging system user controls
45 mode selection slide
46 four way trigger controller 47 yes button
48 trigger button
49 no button
50 control surface
52 external memory system user controls
53 opening
54 external memory system
55 door
56 engagement surface
57 data connector
58 removable memory
59 power connector
60 bottom surface
62 imaging system processor
64 read-only memory
66 primary internal memory
68 portable memory device
70 user interface system
74 image sensor
76 display system
78 amplifier
80 audio capture system
82 power supply
84 audio reproduction system
86 imager system
88 communication module
90 external memory system
92 processor
94 non-volatile firmware memory
96 external memory system user interface system
98 computer link
100 removable memory device interface
102 communications link
104 power supply
106 other memory
108 communication connector
120 establish communication step
122 detect new content data files step
124 download content data files step
126 process content data files step
128 store content data files step
130 make record step
132 provide feedback step
134 determine if new content data files for imaging system step
136 upload content data files step
138 provide human detectable indication step
140 establish communication step
142 determine whether imaging system has previously communicated with external memory step
144 adapt the operation of external memory system step
146 determine whether new content data files are available step
147 instruct user that archived copy exists step
148 copy image determining step
149 make an additional archival copy step
150 determine whether sufficient storage capacity is available step
152 store content data files step
154 make record step
155 was a move selected step
156 prompt user to install new archival media step
157 delete content data files on imaging system step
158 move content data files prompt step
160 delete content data files prompt step
170 thumbnail images
171 play selection/progress indicator
172 descriptors
174 disposition options
176 group disposition options

The invention claimed is:

1. An external memory system for use with an imaging system having a source of content data files, the external memory system comprising:
a communications link adapted to exchange data with the imaging system;
an archival memory device interface adapted to store data using an archival memory; and
an external memory system processor adapted to automatically obtain content data files from the imaging system that have not yet been stored by the external memory system, to prepare the obtained content data files for archival storage, and to cause the archival memory device interface to store the prepared content data files without guidance from an ancillary device,
wherein said external memory system processor maintains, in a memory within the external memory system, a record of all content data files that have been stored using the external memory system and, wherein the external memory system processor uses said record of content data files that have already been stored using the external memory system to identify content data files that have not yet been stored using the external memory system.

2. The external memory system of claim 1, further comprising a user interface system, said user interface system being adapted to receive inputs indicating preferences for the preparation of content data files for archival storage and wherein the external memory system processor prepares the content data files based upon the indicated preferences.

3. The external memory system of claim 1, wherein said imaging system comprises a user interface system and the external memory system processor is adapted to receive signals from the user interface system and to process the content data files based upon the signals from the user interface system of the imaging system.

4. The external memory system of claim 1, wherein said external memory system comprises a user interface system and the external memory system processor is adapted to receive signals from the user interface system and to process the content data files based upon the signals from the user interface system of the external memory system.

5. The external memory system of claim 1, wherein said imaging system comprises a user interface system, said user interface system being adapted to receive inputs indicating instructions for editing content data files wherein the preparing of content data files comprises editing the content data files in accordance with editing instructions received by the external memory system processor from the user interface system of the imaging system.

6. The external memory system of claim 1, wherein the preparing of content data files comprises converting the content data files from one format to a second format.

7. The external memory system of claim 1, wherein the preparing of content data files comprises associating metadata in the content data files.

8. The external memory system of claim 1, wherein the archival memory device interface stores prepared content data files using an optical memory.

9. The external memory system of claim 1, further comprising a removable memory interface device adapted to receive a removable memory.

10. The external memory system of claim 9, wherein the removable memory comprises a rewritable memory.

11. The external memory system of claim 9, wherein the removable memory contains content data files in one form and the processor prepares the content data files by converting the content data files into a different form.

12. The external memory system of claim 9, further comprising a user interface system, said user interface system being adapted to receive inputs indicating instructions for editing content data files wherein the preparing of content data files comprises editing the content data files in accordance with the editing instructions.

13. The external memory system of claim 12, wherein the imaging system maintains a record of each content data file that has been stored using the archival memory device interface.

14. The external memory system of claim 1, wherein the record includes an identifier, for each content data file, unique to the imaging system from which it originated.

15. An external memory system, comprising:
a communications link adapted to exchange data with an imaging system having a source of content data files;
an archival memory device interface adapted to store data using one of a plurality of removable archival memories; and,
an external memory system processor adapted to automatically obtain content data files from the imaging system that have not yet been stored by the archival memory device interface using any of the removable archival memories, to cause the archival memory device interface to store the obtained content data files using at least one of the archival memories, and to maintain, in a memory within the external memory system, a record of all content data files that have already been stored by the archival memory device interface and use said record to identify content data files that have not yet been stored by the archival memory device interface, and wherein the external memory processor is configured to operate independent of a computer system.

16. The external memory system of claim 15, wherein the content data files are obtained in one form and the external memory system processor prepares content data files for archival storage by converting the content data files into another form.

17. The external memory system of claim 15, the external processor maintains a record of the archival memory system.

18. The external memory system of claim 15, wherein the archival memory device interface can store content data files on more than one archival memory and the external memory system processor maintains a record of the archival memory.

19. The external memory system of claim 15, wherein the content data files are obtained in a first format and stored in the archival memory in a second format.

20. The external memory system of claim 15, wherein the content data files are stored in a second format that is adapted for archiving images.

21. The external memory system of claim 15, wherein the record includes an identifier, for each content data file, unique to the imaging system from which it originated.

22. A method implemented by an external memory system, the method for archiving digital content using an archival memory device interface of the external memory system to record data on one of a plurality of removable archival memories, the method comprising the steps of:

maintaining, in a memory within the external memory system, a record of all content data files that have been stored by the archival memory device interface;
detecting an imaging system having a memory with content data files stored thereon;
identifying content data files that have not yet been stored by the archival memory device interface using one of the plurality of removable archival memories by automatically accessing the record of content data files that have already been stored by the archival memory device interface;
obtaining content data files that have not yet been stored by the archival memory device interface;
preparing the obtained content data files for archival storage by the archival memory device interface; and
causing the archival memory device interface to store the prepared content data files on one of the plurality of removable archival memories.

23. The method of claim 22, wherein the step of preparing the content data files comprises converting the form of the content data files.

24. The method of claim 22, wherein the step of preparing the content comprises receiving image editing instructions and processing the image in accordance with the image editing instructions.

25. The method of claim 22, further comprising the step of causing the record to indicate each content data file that has been stored.

26. The method of claim 22, further comprising the step of obtaining preference information for processing content and wherein the step of preparing the content comprises preparing the content in accordance with the preference information.

27. The method of claim 22, further comprising the step of causing the record to indicate each content data file that has been stored, and to indicate which of the plurality of removable archival memories each content data file was stored on.

28. The method of claim 22, wherein the record includes an identifier, for each content data file, unique to the imaging system from which it originated.

29. A method implemented by an external memory system, the method for archiving digital content data including at least some captured image content, the method comprising the steps of:

maintaining, in a memory within the external memory system, a record of all content data files that have been stored by an archival memory device interface of the external memory system;
detecting an imaging system having an imaging system memory with digital content data files stored thereon that have not yet been archivally stored using the archival memory device interface;
obtaining the detected content data files from the imaging system memory;
preparing the obtained content data files for archival storage by the archival memory device interface using an archival memory; and
causing the archival memory device interface to store the prepared content data files using the archival memory;
wherein the step of detecting comprises identifying content data files that have not yet been stored by the archival memory device interface based upon said record maintained by the archival memory device interface of content data files that have already been stored using the archival memory device interface.

30. The method of claim 29, further comprising the steps of determining for each content data file, whether the content data file has been previously stored on an archival memory and the step of obtaining content comprises obtaining only those content data files that have not been previously stored.

31. The method of claim 29, further comprising the steps of providing a human detectable indication of content data files that have not been previously stored, detecting a request for performing editing operations on the content data files that have not been previously stored, receiving editing instructions, processing the content according to the editing instructions prior to performing the step of causing content in the imaging system memory that has not been stored in a non-volatile memory to be stored in a non-volatile memory.

32. The method of claim 29, wherein the record includes an identifier, for each content data file, unique to the imaging system from which it originated.

* * * * *